Patented July 25, 1950

2,516,284

UNITED STATES PATENT OFFICE 2,516,284

IMPREGNATING A DIALDEHYDE TANNED HIDE WITH A RESIN OF UREA, FORMALDEHYDE, AND A PRIMARY AMINE

Adolph H. Winheim, Webster Groves, Mo., and Edward E. Doherty, Buford, Ga.

No Drawing. Application August 31, 1949, Serial No. 113,475

9 Claims. (Cl. 8—94.33)

This invention relates to impregnating a dialdehyde tanned hide with a resin of urea, formaldehyde and a primary amine; and it comprises a process wherein a hide which has been tanned with a dialdehyde, such as glyoxal, is treated with a resin-forming aqueous mixture of urea, formaldehyde and a water-soluble primary amine, in which mixture these components are present in the molecular proportions of from about 1 mole urea to about 1–2.25 moles formaldehyde and to about 0.1–0.5 mole primary amine; followed by condensing these components in situ, whereby a flexible leather of excellent firmness, fullness and fiber structure is obtained whose flexibility is determined by the quantity of primary amine incorporated in said aqueous mixture; all as more fully hereinafter set forth and as claimed.

In a copending application, Serial No. 736,123, filed March 20, 1947, we have described a process of tanning hides in which the hides are first tanned with a dialdehyde, such as glyoxal, and then treated with an aqueous resin-forming mixture of urea and formaldehyde, with the urea present slightly in excess of resin-forming proportions, followed by condensation of the resin in situ. This procedure results in a leather of good fullness and firmness and acceptable commercially. In contrast, when a hide which has been tanned with formaldehyde is treated with the same aqueous mixture of urea and formaldehyde followed by condensation in situ, a leather of inferior properties is produced which would not be acceptable to the trade. Upon examination under a microscope the urea-formaldehyde resin present in the formaldehyde tanned leather appears to be present as a mere filler having substantially the appearance of plaster of Paris, the fibers of the leather being scarcely visible. In contrast the resin present in the dialdehyde tanned leather seems to be enclosed in the fiber structure since the fibers are plainly visible and of substantial fullness.

We have explained this difference in result by a theory which is supported by all available evidence and in which it is assumed that when a hide is tanned with a dialdehyde a portion of the molecules of the latter attach themselves to the reactive amino and possibly imino groups present in the collagen molecule by one only of their aldehyde groups leaving other aldehyde groups free for subsequent reaction with aldehyde-reactive materials capable of forming resins with aldehydes. We visualize that the uncombined amino groups of the urea present in the aqueous mixture with which the tanned hide is treated condense with the unattached aldehyde groups of the dialdehyde and thus the resin becomes keyed or chemically bound directly to the fiber. As stated in our copending application, this is, of course, a kind of co-polymerization reaction because the urea, formaldehyde and the free aldehyde groups of the tanned hide all react to form complex polymers chemically bound to the collagen fibers.

We have found, however, that the leather produced by the process of our acknowledged copending application is somewhat too stiff and hard for certain special uses and our present invention represents an improvement in that the leather produced by the present process is softer and much more flexible while retaining all the other advantages of the prior product. The leather produced by our present process has what might be called a controlled flexibility and suppleness since these properties can be predetermined by the composition of the resin-forming composition with which the dialdehyde-tanned hide is treated.

We have discovered that if a dialdehyde-tanned hide is treated with an aqueous resin-forming mixture of urea and formaldehyde containing a minimum of about 5 per cent by weight of a water soluble primary amine, based on the weight of the urea and formaldehyde present, an appreciable increase in softness and flexibility is obtained while, if the proportion of primary amine is raised to about 30–40 per cent by weight the leather obtained becomes very soft and flexible. The optimum molecular proportions of urea to formaldehyde to primary amine appear to be about 1:1–2.25:0.1–0.5. All of the primary amines which we have tested have proved operative with the exception of a few whose solubility was too low. Our tests show that the primary amines must be soluble in water to the amount of at least about 2 per cent by weight and that all amines which have a greater solubility than this are operative to produce the described increase in flexibility and improvement in other properties.

Our above described theory provides an explanation for our new discoveries. When urea and formaldehyde react to form a linear polymer theoretically there is no limit to the length of chain or to the number of cross-linkages between chains which can be produced since at both ends of the chain there is always a reactive group present and every nitrogen atom in the chain has a reactive hydrogen atom attached thereto through which a cross-linkage can be formed. This results in a rigid structure. However whenever a molecule of a primary amine becomes incorporated in such a chain no cross-linkages can occur at the nitrogen atom of the amine since no reactive hydrogen atom is attached thereto. We therefore believe that the addition of a primary amine to the resin-forming composition results in a reduction of cross-linkages between chains—in effect it produces a blocking action to cross-linking and therefore favors the formation of linear polymers. The latter, as would be expected, produce a more flexible and elastic resin. Some support is lent to this theory by the fact that secondary and tertiary amines do not produce the same results as primary amines. The former have no appreciable effect on the flexibility of the leather. But whatever the true explanation may be the facts remain as stated; namely, that the incorporation of a primary amine in the resin-forming aqueous mixture results in a leather of greatly increased flexibility.

An important incidental advantage in using one of our amine blocking agents in the aqueous resin-forming bath is that the amines slow down the condensation reaction to such an extent that the hide can be drummed in the aqueous resin-forming bath for a considerable length of time without condensation taking place. This ensures thorough impregnation of the leather with the resin-forming composition and results in greater uniformity in the finished leather. In the absence of the blocking agent in order to prevent premature condensation it may be necessary to keep the treating bath at least neutral by the addition of buffering chemicals. This raises the pH of the leather which is harmful. In contrast when the blocking agent is added to the bath this slows down the condensation to such an extent that it is possible and advantageous to keep the bath on the acid side of the neutral point. This makes it possible to conduct the condensation step by merely piling the impregnated leather until condensation takes place, a procedure which eliminates the necessity of using acid gas chambers in the condensation step.

Our invention can be described in greater detail by reference to the following specific examples which represent practical operating embodiments of our process. The amines employed in these examples are typical of the various types of primary amines of which they are representative examples.

*Example 1*

A piece of hide was tanned with glyoxal by the method described in our acknowledged copending application. This had a pH of 7.5 and was washed after which excess water was wrung out of it. Six adjacent pieces were cut from this piece of hide and two each were placed in the following aqueous liquors:

1. Control—
    70 parts formaldehyde (37%, neutralized)
    38 parts urea
    50 parts water
    12 parts NaCl

2. One-third urea replaced by ethylenediamine—
    70 parts formaldehyde (37%)
    25 parts urea
    9.3 parts ethylenediamine
    50 parts water
    12 parts NaCl

3. One-sixth of urea replaced by ethylenediamine—
    70 parts formaldehyde (37%)
    31.5 parts urea
    4.6 parts of ethylenediamine
    50 parts water
    17 parts NaCl The pieces were drummed in the above solutions for eight hours. They were then taken out, rinsed in water to remove the monomers from the surface, and place over acetic acid in a closed container for two days at room temperature (the ethylenediamine slows down the condensation, so the pieces were left two days over the acid to increase their acidity), held over water in a closed container for one week, then washed, neutralized, and oiled off with neat's-foot oil.

Results:
    #1—Hard.
    #2—Very soft.
    #3—Medium soft.
    All had a full feel.

*Example 2.—Monoethylamine*

A band of pickled hide (tannery run) was cut into two pieces in size about 1½ square feet per piece. These were tanned in 15% glyoxal (30% solution) containing 10% NaCl and neutralized to a pH of 7.5 in the usual manner. They were then washed thoroughly and the excess water was squeezed out. One piece was placed in the following bath:

1 solution (control)—
    1400 parts formaldehyde (37%)
    760 parts urea
    850 parts water
    230 parts NaCl while the other piece was placed in the following bath:

2 solution—
    1400 parts formaldehyde (37%)
    570 parts urea
    202 parts monoethylamine (70%)
    850 parts water
    230 parts NaCl The two pieces were drummed in the respective baths for several hours and left to stand over night. The following morning they were drummed intermittently for one hour, taken out and rinsed lightly, and then hung over acetic acid in a closed container for one day. They were then held for one week in a closed container over water, after which they were oiled off with neat's-foot oil and dried.

Results:
    #1—Firm and rather hard.
    #2—Pliable, medium soft.
    Both pieces had a full feel.

*Example 3.—Monomethylamine*

Pieces of glyoxal tanned hide taken from the same hide and adjacent to each other were used. They were washed and excess water was squeezed out. One piece was placed in the control bath

1 of Example 1 while the second was placed in a bath of the following composition:

2 solution—
    70 parts formaldehyde (37%)
    28.5 parts urea
    11.9 parts monomethylamine
    50 parts water
    12 parts NaCl The baths were allowed to stand for 2 hours and the pH was adjusted to 7.5 with acetic acid. The pieces were then put in and drummed for 8 hours, taken out, rinsed lightly and placed over acetic acid in a closed container for 24 hours. They were then kept in a closed container over water for a week, washed, neutralized and fat liquored together, being finally oiled off with neat's-foot oil and dried.

Results:
    #1—Firm and rather hard.
    #2—Pliable (medium soft).
    Both had a full feel.

*Example 4*

A pickled hide was drained and placed in a 15% glyoxal (30% solution) containing 10% NaCl and the pH adjusted to 7.5. The hide was then drummed intermittently and the pH kept at 7.5 with additions of sodium bicarbonate. When a cross cut showed that the hide was about pH 7.5 throughout, the hide was washed and wrung out by hand. It was then cut into small adjacent strips. The following baths were prepared:

1. Control—
    280 parts formaldehyde (37%, neutralized)
    152 parts urea
    45 parts NaCl
    170 parts water

2. Isopropylamine—
    280 parts formaldehyde
    114 parts urea
    76 parts isopropylamine (50%) (¼ of the urea)
    46 parts NaCl
    170 parts water

3. Aniline—
    280 parts formaldehyde
    114 parts urea
    24.6 parts aniline (¼ of the urea)
    46 parts NaCl
    170 parts water

4. Aniline—
    280 parts formaldehyde
    133 parts urea
    12.3 parts aniline (⅛ of the urea)
    46 parts NaCl
    170 parts water

5. Ethanolamine—
    280 parts formaldehyde
    114 parts urea
    38 parts ethanolamine (¼ of the urea)
    46 parts NaCl
    170 parts water

6. Decylamine—
    280 parts formaldehyde
    133 parts urea
    50 parts decylamine (¼ of the urea)
    46 parts NaCl
    170 parts water

7. Benzylamine—
    280 parts formaldehyde
    114 parts urea
    28.3 parts benzylamine (¼ of the urea)
    46 parts NaCl
    170 parts water

8. Cyclohexylamine—
    280 parts formaldehyde
    114 parts urea
    26.1 parts cyclohexylamine (¼ of the urea)
    46 parts NaCl
    170 parts water The above baths stood overnight and the pH of each was adjusted to 7.5 with acetic acid. Two pieces of the glyoxal tanned leather were placed in each bath and drummed for several hours, left overnight and again drummed. The strips were then dipped in water and placed over acetic acid in a closed container for 24 hours. They were kept in moist condition for one week, neutralized and washed, finally being given a light fat liquor and dried. The results obtained are as follows:

Results:
    #1—Fairly hard.
    #2—Very soft.
    #3—This was quite soft but the resin solution contained unreacted aniline showing that part had remained undissolved.
    #4—Medium soft.
    #5—Very soft.
    #6—Medium soft.
    #7—Medium soft.
    #8—Medium soft.
    All samples were found to have a full feeling.

In test #6 a waxy precipitate formed when the ingredients of the bath were mixed. The solution was decanted and the supernatant used for the treatment. It is evident, however, that sufficient decylamine remained in solution to produce the desired results since the leather treated in this bath was definitely softer than the control. These results show that decylamine has a water solubility which is close to the minimum required for the production of satisfactory results in our process.

The molecular ratio of the formaldehyde to the urea plus amine used in the above experiments was about 1.35 to 1. It is possible, however, to vary this ratio within the range of from about 1–1.7 to 1. Our tests show that up to about 35 to 40% of the urea can be replaced by the primary amine.

While we have disclosed what we consider to be the best embodiments of our process it is obvious, of course, that various details of the procedures which have been described can be varied to a considerable extent without departing from the purview of this invention. Thus, if a primary amine should be too insoluble in water to produce the desired softening effect on the leather, it is possible to add a water-miscible organic solvent to the resin-forming aqueous mixture in order to increase its solubility to the desired extent. The temperatures used in this impregnating step can also be varied to a considerable extent provided that temperatures harmful to the leather are not used. Ordinary room temperatures are in general suitable. Any conventional impregnating method can be used which is suitable for the particular purpose in question. It is also possible to use any of the conventional methods of condensing the resin in situ. Thus acidic vapors other than that from acetic acid can be employed to acidify the treated leather, such as $SO_2$, for example, and, as mentioned previously, if the impregnating bath is on the acid side or is acidified shortly before removing the leather therefrom, it is possible to produce condensation of the resin merely by placing the leather in piles and allowing it to stand for a time. Our process is operative with hides which have been tanned with any of the available dialdehydes capable of tanning hides, such as malonic dialdehyde, succinic dialdehyde, terephthalaldehyde and thio-diglycollicaldehyde. However glyoxal is more available commercially and is cheaper; hence we prefer to use this in the tanning step of our process. It is also obvious, of course, that amine salts can be substituted for the amines used in the above examples. In Example 1 ethylene diamine acetate can be substituted for the ethylene diamine, for example. In the case of salts of strong acids, such as the hydrochlorides, it is sometimes necessary to add an alkali to the treating bath to counteract the acidity and prevent premature resin formation. Otherwise the amine salts are complete equivalents of the amines and in the following claims the term "amine" is intended to include the salts thereof. If desired colored leathers can be produced by incorporating a suitable dye or pigment in the impregnating bath, for example. For this purpose all methods are available which have been used in the art for coloring urea-formaldehyde resins. Other modifications of our invention which fall within the scope of the following claims will be immediately evident to those skilled in this art.

What we claim is:

1. In the manufacture of leather, the process which comprises impregnating a hide, which has been tanned with a dialdehyde, with a resin-forming composition comprising urea, formaldehyde and a water-soluble primary amine, then condensing the resin-forming composition in situ, whereby a leather is produced which is softer and more flexible than that produced in the absence of said primary amine, sufficient primary amine being present in said composition to produce a softening effect on the leather.

2. In the manufacture of leather, the process which comprises impregnating a hide, which has been tanned with a dialdehyde, with an aqueous bath containing urea, formaldehyde and a relatively smaller proportion of a water-soluble primary amine in resin-forming proportions, then condensing the resin-forming composition in situ, whereby a leather is produced which is softer and more flexible than that produced in the absence of said primary amine.

3. The process of claim 2 wherein the urea, formaldehyde and primary amine are employed in the molecular proportions of from about 1 mole urea to 1–2.25 moles formaldehyde and to 0.1 to 0.5 mole primary amine.

4. The process of claim 2 wherein the resin is condensed by exposing the impregnated leather to an acidic atmosphere.

5. The process of claim 2 wherein the resin is condensed by exposing the impregnated leather to an atmosphere containing acetic acid vapors.

6. The process of claim 2 wherein the impregnating bath is acid at least at the conclusion of the impregnating step and the resin is condensed by placing the impregnated leather in piles.

7. The process of claim 2 wherein the aqueous bath contains a molecular ratio of formaldehyde to urea plus amine within the range of about 1–2.25 to 1 with the amine amounting to from about 5 to 40 per cent by weight of the urea.

8. The process of claim 2 wherein the leather treated is one which has been tanned with glyoxal.

9. In the manufacture of leather, the process which comprises drumming a gyoxal-tanned hide in an aqueous bath containing urea, formaldehyde and a water-soluble primary amine in the molecular proportions of from about 1 mole urea to 1–2.25 moles formaldehyde and to 0.1 to 0.5 mole primary amine, in order to thoroughly impregnate the leather with urea, formaldehyde and primary amine, removing the impregnated leather from the bath and exposing it to the action of acetic acid vapors until the urea, formaldehyde and amine have condensed to form a resin and controlling the softness and flexibility of the so-impregnated leather by varying the quantity of primary amine in said aqueous bath within the range stated.

ADOLPH H. WINHEIM.
EDWARD E. DOHERTY.

REFERENCES CITED

The following references are of record in the file of this patent:

UNITED STATES PATENTS

| Number | Name | Date |
|---|---|---|
| 2,246,070 | Schlack | June 17, 1941 |
| 2,317,181 | D'Alelio | Apr. 20, 1943 |
| 2,414,858 | Davidson | Jan. 28, 1947 |

OTHER REFERENCES

"Jour. Amer. Lea. Chem. Assn.," April 1944, page 148, by Niedercorn.

"Chemical and Eng. News," Aug. 1948, page 2308.